Nov. 13, 1923.  
J. C. JONES ET AL  
1,473,706  
SPLIT GEAR  
Original Filed Feb. 24, 1922   2 Sheets-Sheet 1
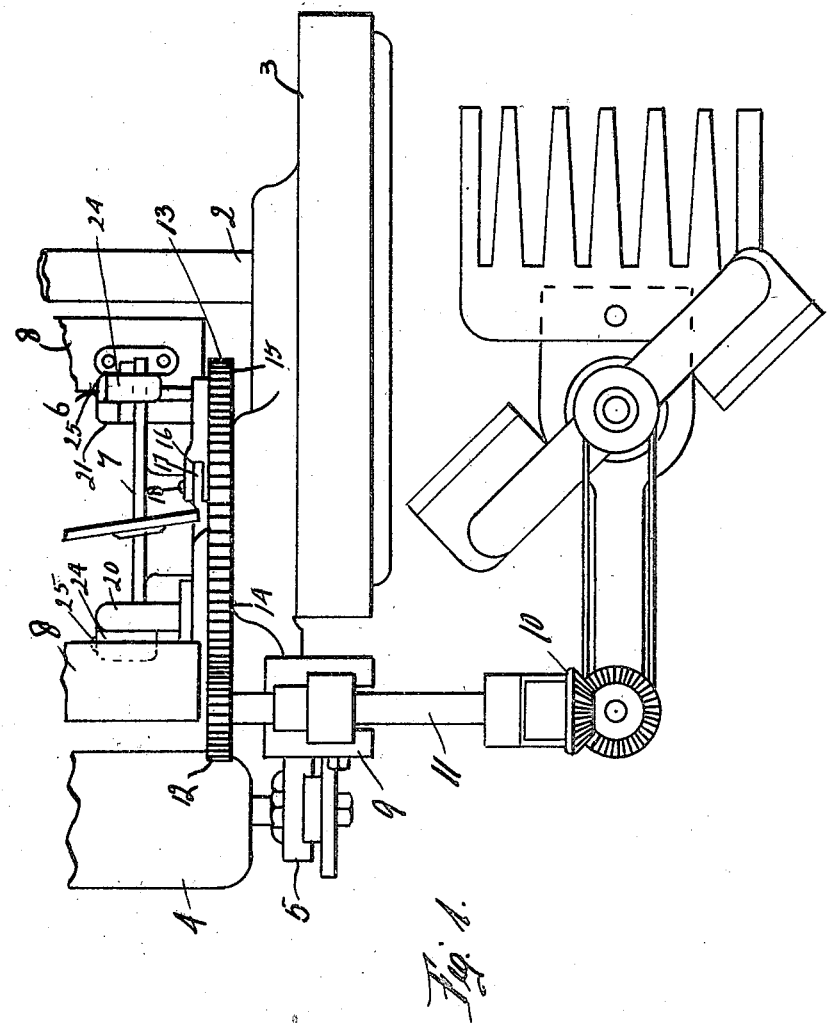
INVENTORS  
James C. Jones  
Adolf C. Kreutzer  
By W. W. Williamson Atty.

Nov. 13, 1923.  1,473,706
J. C. JONES ET AL
SPLIT GEAR
Original Filed Feb. 24, 1922  2 Sheets-Sheet 2
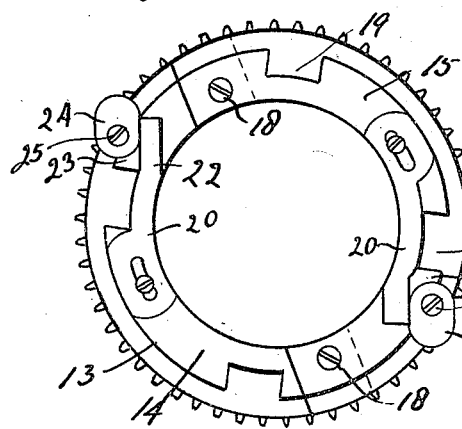
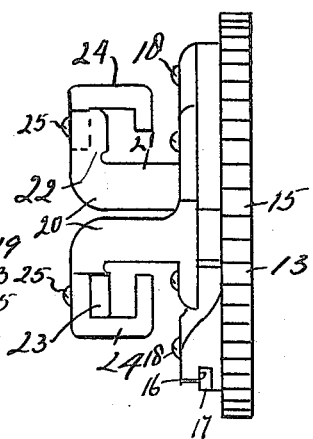
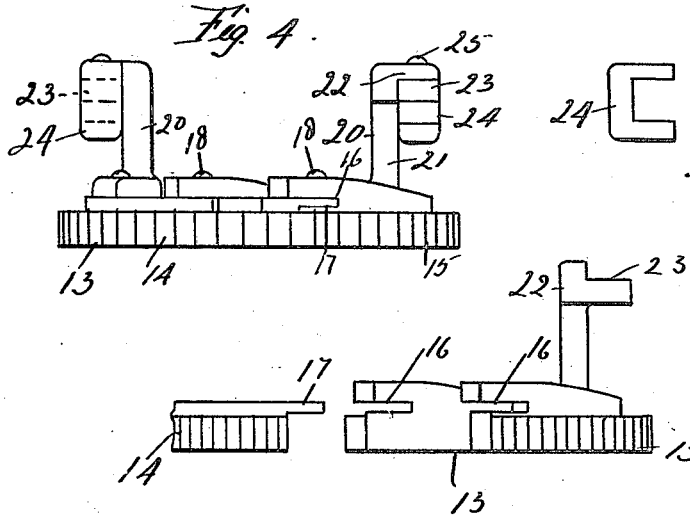
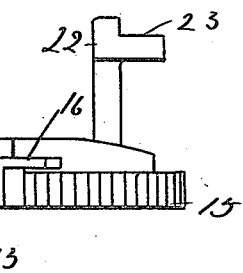
INVENTORS
James C. Jones
Adolf C. Kreutzer Patented Nov. 13, 1923.

1,473,706

UNITED STATES PATENT OFFICE.

JAMES C. JONES AND ADOLF C. KREUTZER, OF PHILADELPHIA, PENNSYLVANIA.

SPLIT GEAR.

Original application filed February 24, 1922, Serial No. 538,869. Divided and this application filed January 31, 1923. Serial No. 616,005.

*To all whom it may concern:*

Be it known that we, JAMES C. JONES and ADOLF C. KREUTZER, citizens of the United States, residing at Philadelphia, in the county of Philadelphia and State of Pennsylvania, have invented new and useful Improvements in a Split Gear, of which the following is a specification.

Our invention relates to new and useful improvements in a split gear, the same being a division from our application bearing Serial Number 538,869, dated February 24th, 1922, and has for its primary object to provide a split or sectional gear of unique construction with the revolving cutter of a lawn mower and through the medium of which motion is transmitted from the lawn mower cutter to the grass trimmer shown and described in the above named application.

Another object of the invention is to provide a split gear including two sections or segments of semi-circular formation the ends of one section having grooves to receive tongues at the ends of the other section.

A further object of the invention is to provide means for attaching the gear to a spider such as that forming a part of the revolving cutter of a lawn mower.

With these ends in view, this invention consists in the details of construction and combination of elements hereinafter set forth and then specifically designated by the claims.

In order that those skilled in the art to which this invention appertains, may understand how to make and use the same, we will describe its construction in detail, referring by numerals to the accompanying drawings forming a part of this application, in which:—

Fig. 1, is a fragmentary plan view of a lawn mower showing our improved split gear attached thereto and its connection with the grass trimmer referred to above.

Fig. 2, is an enlarged face view of the detachable split gear.

Fig. 3, is an edge view thereof.

Fig. 4, is also an edge view thereof at right angles to the view shown in Fig. 3.

Fig. 5, is a fragmentary edge view similar to Fig. 4 with the sections of the gear slightly separated and the U shaped clamps removed.

Fig. 6, is an edge view of one of the U shaped clamps.

In carrying out our invention as here embodied, 2 represents a lawn mower of any ordinary well known construction including a tractor wheel 3, a balancing or supporting roller 4, a frame 5 and a revolving cutter 6. The revolving cutter includes a spider 7 or a framework to which the blades 8 are connected.

On the frame is supported a socket 9 which in turn supports the grass cutter 10 fully described in the application above referred to and including a driving shaft 11 on one end of which is mounted a pinion 12 adapted to mesh with the split driving gear 13.

The driving gear consists of two sections or segments 14 and 15 of substantially semi-circular shape. The segment or section 15 has a groove 16 at each of its ends to receive a tongue 17 at each end of the segment or section 14 and when said segments are properly positioned relative to one another they are fastened together by screws 18 passing through portions of the segment 15 in the region of the grooves and through the tongues 17. In the rear face of each segment are formed recesses 19 for registration with the ends of the blades of the lawn mower revolving cutter, as shown in Fig. 1. An arm 20 is also carried by each segment which passes part way around a rib of the spider 7 of the lawn mower, said spider forming a part of and located at one end of the revolving cutter. Each arm 20 consists of a shank 21, an extension 22 at the upper end of the shank arranged at right angles to said shank and a lug 23 projecting outwardly from said extension, said lug preferably being of less thickness than the extension.

When the sectional driving gear is in place the lug 23 is disposed across one face of two of the spider arms and said lugs and the spider arms are then straddled by the U shaped clamp 24 having screws 25 threaded through one of the arms of each clamp and through the lugs 23 so as to securely clamp the parts of the spider and prevent its accidental displacement.

By constructing the driving gear in this manner the same may be readily placed in position or removed without dismantling any part of the lawn mower.

Of course we do not wish to be limited to the exact details of construction as herein shown as these may be varied within the limits of the appended claims without departing from the spirit of our invention.

Having thus fully described our invention, what we claim as new and useful is:—

1. A split driving gear comprising two segments or sections having interengaging elements, means for fastening said elements together, an arm carried by each segment, each arm consisting of a shank, a right angled extension and an outwardly projecting lug at the side of said extension, said arms adapted to partially surround the arms of a spider and clamps provided with means for fastening them to the lugs whereby the gear is detachably secured to said spider.

2. In a device of the character stated, a split driving gear consisting of two substantially semi-circular sections or segments, tongues formed at the ends of one of said segments for registration with grooves in the ends of the other segment, means for fastening said segments together, each of said segments having recesses for registration with elements of a spider to which the gear is attached, an arm projecting from each segment and adapted to partially surround the arms of said spider, clamps straddling the spider arms and portions of the gear arms, and means for connecting said clamp with the gear arms for detachably fastening them to the spider.

In testimony whereof, we have hereunto affixed our signatures.

JAMES C. JONES.
ADOLF C. KREUTZER.